United States Patent [19]

Ankersmit et al.

[11] Patent Number: 5,417,051
[45] Date of Patent: May 23, 1995

[54] PROCESS AND INSTALLATION FOR THE COMBINED GENERATION OF ELECTRICAL AND MECHANICAL ENERGY

[75] Inventors: Jan H. Ankersmit, Schiedam; Rudolf Hendriks, Velp; Leo J. M. J. Blomen, Vooreschoten, all of Netherlands

[73] Assignee: Mannesmann Aktiengesellschaft, Dusseldorf, Germany

[21] Appl. No.: 39,261

[22] PCT Filed: Sep. 30, 1991

[86] PCT No.: PCT/DE91/00781
§ 371 Date: Apr. 15, 1993
§ 102(e) Date: Apr. 15, 1993

[87] PCT Pub. No.: WO92/07392
PCT Pub. Date: Apr. 30, 1992

[30] Foreign Application Priority Data
Oct. 15, 1990 [DE] Germany .................. 40 32 993.3

[51] Int. Cl.[6] ............................................. F02C 6/00
[52] U.S. Cl. .................... 60/39.02; 60/39.07; 60/39.511; 429/17
[58] Field of Search .............. 60/39.02, 39.07, 39.12, 60/39.511; 429/17, 19, 20, 26

[56] References Cited

U.S. PATENT DOCUMENTS

| | | | |
|---|---|---|---|
| 3,167,913 | 2/1965 | Muhlberg et al. | 60/39.02 |
| 4,522,894 | 6/1985 | Hwang et al. | 429/19 |
| 4,622,275 | 11/1986 | Noguchi et al. | 429/19 |
| 4,743,516 | 5/1988 | Noguchi et al. | 429/17 |
| 4,865,926 | 9/1989 | Levy et al. | 429/17 |
| 4,973,528 | 11/1990 | Sanderson | 429/17 |

FOREIGN PATENT DOCUMENTS 290665 12/1986 Japan .

Primary Examiner—Louis J. Casaregola
Attorney, Agent, or Firm—Cohen, Pontani, Lieberman, Pavane

[57] ABSTRACT

The invention relates to a process for the combined generation of electrical and mechanical energy from the oxidation of fuel. In particular a hydrogen-containing gas is generated by endothermic reaction of hydrocarbon compounds, in which a portion of the hydrogen-containing gas is burned for generating a combustion gas. An oxygen-containing gas is then compressed and introduced into the combustion stage, and the energy is generated by expanding the hot combustion gas in at least one gas turbine. Further, the expanded combustion gas is used for indirect heating of the endothermic reaction. According to the present invention, at least a part of the generated hydrogen-containing gas is to be guided as anode gas through a fuel cell system for generating electrical energy and the anode exhaust gas is used for generating the combustion gas.

34 Claims, 4 Drawing Sheets

PROCESS AND INSTALLATION FOR THE COMBINED GENERATION OF ELECTRICAL AND MECHANICAL ENERGY

FIELD OF THE INVENTION

The invention relates to a process for the combined generation of electrical and mechanical energy from the oxidation of fuel, as well as to an apparatus for carrying out the process.

BACKGROUND OF THE INVENTION

In most thermal power stations electrical energy is generated by first producing superheated steam by means of burning fossil fuels in boiler installations. The steam is expanded in steam turbines and, in doing so, converted into mechanical energy. The steam turbines are coupled with electric generators so that this mechanical energy is converted into electrical energy. This is effected with an efficiency of well over 90%. On the other hand, the efficiency of the conversion of the energy chemically bonded in the utilized fuel into mechanical energy is quite modest, as the turbine efficiency is at most approximately 37% even in large turbines, and losses in the heating boiler must also be taken into account.

Therefore, in many cases only roughly 35% of the heat released during combustion could previously be effectively used for generating electricity, while roughly 65% was lost as exhaust heat or could only be used purely for heating purposes.

More recently, a considerable increase in mechanical or electrical efficiency was achieved by employing a combination of gas turbines and steam turbines for converting the thermal energy into mechanical energy. The hot combustion gases are first expanded in gas turbines and the heat of the exhaust gas of these gas turbines is used for generating the steam for the steam turbines. Other possibilities for improvement consist in guiding the expanded steam flowing out of a steam turbine back into the combustion chamber of the gas turbine connected upstream, thus generating a greater volume flow for driving the gas turbine. These steps have made it possible to raise the efficiency of the conversion of thermal energy into mechanical energy in larger plants (over 50 MW) in the order of magnitude of approximately 48 to 50%.

A process and an installation for generating mechanical energy from gaseous fuels is known from the European Patent 0 318 122 A2, in which the mechanical energy which can be used, for example, to generate current is delivered solely by means of a gas turbine, rather than partially by means of a steam turbine. This gas turbine, which is provided particularly for an output range of 50 to 3000 KW, achieves an efficiency of approximately 42% with respect to the utilized thermal energy (net calorific value). To this end, combustion air is first compressed in a compressor. The compressed combustion air is then heated in an exhaust gas heat exchanger, partially expanded via a first gas turbine which only drives the compressor, and subsequently fed to a combustion chamber in which fuel is burned with this combustion air.

The hot exhaust gas formed during combustion drives a second gas turbine which supplies the actual usable mechanical energy. The still hot exhaust gas flowing out of the second gas turbine is used for operating the exhaust gas heat exchanger for heating the compressed combustion air.

In the German Patent 40 03 210.8, which was not published beforehand, the Applicants already suggested a process for generating mechanical energy which can be converted into electrical energy by means of an electric generator. This process provides that a starting fuel based on hydrocarbon compounds is first converted in a steam reformation into a hydrogen-rich gas of superior value from an energy standpoint before this hydrogen-rich gas is burned in one or more combustion chambers. The combustion is effected by means of a compressed oxygen-containing gas (e.g. compressed air). The generated hot combustion gas is expanded in a gas turbine generating the externally deliverable or output mechanical energy, is correspondingly cooled off and then used for indirect heating of the steam reformer. The combustion gas which is further cooled in the steam reformer is then used for heating the compressed combustion air in a further indirect heat exchange. The compressed combustion air accordingly obtains so much energy that it can be partially expanded in a gas turbine before being used for the combustion and thus supplies the required drive energy for generating compressed air. In another variant of this process, the compressed combustion air which is heated by the indirect heat exchange is first guided into a combustion chamber and is there burned with a portion of the hydrogen-rich gas so that a still hotter gas is available for expansion in the gas turbine.

This process makes it possible to increase the efficiency of the conversion of the energy (net calorific value $H_u$) contained in a conventional fuel (e.g. natural gas or biogas) into mechanical energy at a reasonable cost in small plants (up to approximately 3 MW output) by at least 50% and in larger plants by at least 55%.

As a rule, it is provided in such processes ultimately to convert the generated mechanical energy into electric current. This is because energy can be most easily transported to the desired location with an energy requirement in this form and can be converted back into other forms of energy (e.g. mechanical or thermal) with high efficiency in a comparably simple manner. On the other hand, the increasing demand for substantial reductions in $CO_2$ and other pollutants (particularly $NO_x$, $SO_x$) formed in the conversion of fuels into electric current or mechanical energy must be taken into account. With respect to $CO_2$, this demand can be met without incurring the costs for separating $CO_2$ from the occurring exhaust gases only if the energy chemically bonded in the utilized fuel is converted in a considerably more efficient manner than was previously the case. Thus there is a need for a further increase in the efficiency of energy conversion not only for purely economic reasons but also for purposes of environmental protection.

OBJECT OF THE INVENTION

The object of the invention is therefore to provide a process and an installation for implementing this process which allows the conversion of the energy chemically bonded in a fuel (net calorific value $H_u$) into electrical and mechanical energy with an efficiency of at least 60%, possibly even more than 65%.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

This object is met by a process with the features of patent claim 1. This process can be advantageously developed according to the invention by means of the characterizing features of subclaims 2 to 21. An installation for carrying out this process has the features of patent claim 22 and can be advantageously developed by means of the characterizing features in subclaims 23 to 44.

SUMMARY OF THE INVENTION

The invention is based on the idea of converting a conventional fuel into a richer hydrogen-containing fuel by an endothermic reaction (e.g. steam reformation) initially by making use of exhaust heat and then using at least a portion as fuel in a fuel cell for the direct generation of electrical energy. A majority of the hydrogen content is consumed by oxidation. The remaining residual hydrogen content and the other combustible components (CO and unconverted hydrocarbon compounds) of the original hydrogen-rich gas are then supplied for burning. The gas provided for combustion can be a mixture of different gas flows formed in the process and can be further enriched by proportions of the primary fuel. The hot combustion gases which are accordingly formed are expanded in a gas turbine system and used for generating mechanical or (when coupled with an electric generator) additional electrical energy. In doing so, it is important that the thermal energy released in the process be converted extensively into the energy forms ultimately aimed for by making the best possible systematic use of the exhaust heat energy. This is effected particularly in that the combustion gas expanded in the gas turbine system, or a partial flow of this combustion gas, is used first to supply heat to the steam reformation process and then additionally for heating the compressed oxygen-containing gas required for generating the combustion gas.

Before the extensively cooled combustion gases are released into the atmosphere, they can be also be used, beyond the generation of electrical and mechanical energy, for the purposes of a power/heat coupling for express heating purposes (e.g. heating buildings, hothouses, etc.) and accordingly make increased use of energy. With respect to the net calorific value of the utilized fuel, the electrical efficiency of the process according to the invention can be increased by 60 to 80% (typically 65-75%) depending on the embodiment form. The invention can be carried out with one or more gas turbines, with one or more steam reformation installations, with one or more fuel cells, and with one or more combustion chambers for generating the required combustion gas. In addition, one or more steam generators and one or more steam turbines can also be provided. Also, connection techniques can be used for serial or parallel connection of identical units. In this context, "fuel cell" refers to any combination of connected fuel cell elements.

BRIEF DESCRIPTION OF THE DRAWINGS

In the drawings, wherein like reference characters denote similar elements throughout the several views.

The invention is explained in more particular detail with reference to the embodiment forms shown by way of example in FIGS. 1 to 5. The drawings show a schematic diagram of an entire installation, or a section thereof, according to the invention.

DETAILED DESCRIPTION OF THE PRESENTLY PREFERRED EMBODIMENTS

Figure 1:
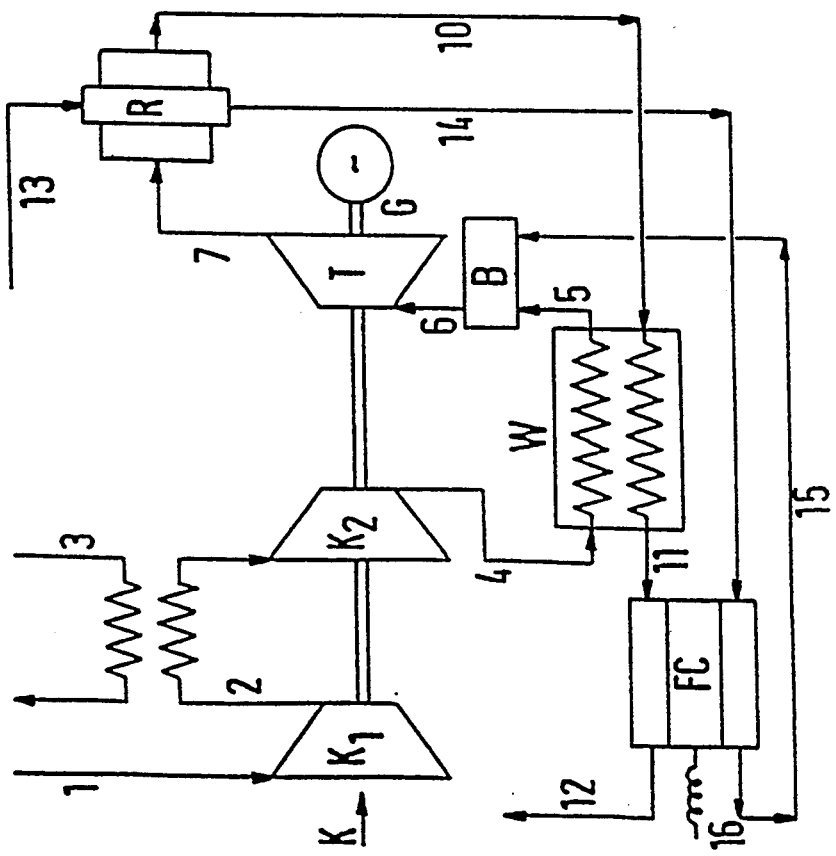
FIG. 1 is a schematic drawing of the first embodiment of the present invention.

In FIG. 1, the installation according to the invention has a compressor system K which includes two compressor stages K1 and K2 and in which an oxygen-containing gas (preferably air) is compressed to a higher pressure. This gas is sucked in through the pipeline I and reaches the second compressor stage K2 via the pipeline 2 of the first compressor stage K1.

A heat exchanger which effects an intermediate cooling of the partially compressed oxygen-containing gas and discharges the extracted heat via a cooling circuit 3 is connected in the pipeline 2. The discharged heat can be used, if desired, for heating purposes external to the process.

However, it is also possible in principle to make use of this heat e.g. to preheat water for generating process steam in the process itself. Of course, the compressor system K can also be constructed in one stage or in more than two stages.

The compressed oxygen-containing gas leaves the final compressor stage K2 via pipeline 4 and arrives in an indirectly heated heat exchanger W. After the increase in temperature has been effected, the oxygen-containing compressed gas is guided through pipeline 5 into a combustion chamber B in which, accompanied by formation of a hot compressed combustion gas, it undergoes an exothermic reaction with a gas which contains hydrogen and possibly other combustible components and is fed via the pipeline 15. In addition to the hydrogen-containing gas, primary fuel (e.g. natural gas) can also be burned (at least intermittently). The hot combustion gas exits the combustion chamber B via a pipeline 6 and is expanded in a gas turbine T until close to the operating pressure of a fuel cell FC. The mechanical energy occurring in the gas turbine T is used in part (e.g. via a mechanical coupling) for driving the compressor system K and in part for generating electrical alternating current in the adjoining generator G.

The extensively expanded combustion gas, which is however still hot, is then directed as heating medium through the pipeline 7 into an indirectly heatable steam reformer R. The steam reformer R can be charged with gaseous hydrocarbons (primary fuel) and steam via a pipeline 13 so that a hydrogen-rich gas is formed therein which is drawn off via the pipeline 14. The combustion gas which is further cooled in the steam reformer R still contains considerable heat. Therefore, it is guided via pipeline 10 into the heat exchanger W where it causes the above-mentioned increase in temperature in the oxygen-containing gas which is under increased pressure. The combustion gas can then be guided off.

Of course, the residual heat energy can also be exploited (e.g. for preheating process water or heating buildings). In the present example, this heat energy is exploited in another manner prior to its final discharge. This requires that combustion be effected in the combustion chamber B with a surplus of oxygen. That is, the extensively cooled combustion gas can be fed as cathode gas via pipeline 11 to the fuel cell FC and can cover its oxygen requirement. Only then is it guided off through the pipeline 12.

The hydrogen-rich gas required as fuel for the fuel cell FC is fed through the pipeline 14 to the anode space of the fuel cell FC. An electrical direct current is generated due to the electrochemical oxidation process in the fuel cell FC and is discharged via the line 16 and, if necessary, can be converted into alternating current by means of an electric inverter, not shown in the drawing. The direct current can also be fed directly to the generator G.

As it is always only a part of the hydrogen content of the hydrogen-rich gas that is converted in the fuel cell FC and additional combustible gas components (e.g. CO and unconverted hydrocarbons) can be contained, the anode exhaust gas from the fuel cell FC is fed through pipeline 15 to the combustion chamber B as fuel. In addition, another portion of the primary fuel can also be fed to the combustion chamber B directly, i.e. without previous conversion by endothermic reaction, to cover the heat requirement. This is advisable particularly for starting up the process and can also simplify regulation. A compressor, not shown in the drawing, can be provided in the pipeline 15 to bring the anode exhaust gas to the pressure required in combustion chamber B. However, the reformer R can also be operated with a suitable overpressure in its reaction space so that the anode gas in the pipeline 14 is already available with sufficient pressure. However, this requires that structural arrangements be made at the fuel cell FC for allowing a corresponding pressure difference between the anode and cathode space.

The fuel cell FC is preferably operated in such a way that the remaining calorific value of the anode exhaust gas is sufficient to ensure the heating of the steam reformer R and to allow mechanical energy to be generated in the gas turbine T beyond the energy requirement for driving the compressor system K. The arrangement of the fuel cell system FC effected at the end of the process on the exhaust gas side is particularly advantageous when a type of fuel cell is employed which works at relatively low operating temperatures. Fuel cells with electrolytes based on phosphoric acid (PAFC), alkali (AFC) or solid polymers (SP(E)FC) are particularly suitable.

FIGS. 2 to 5 show additional schematic embodiment forms of the invention which fundamentally conform to the construction in FIG. 1.

Parts of the installation which share the same function have therefore been provided with the same reference numbers. Therefore, only modifications need be discussed in more detail in the following.

Figure 2:
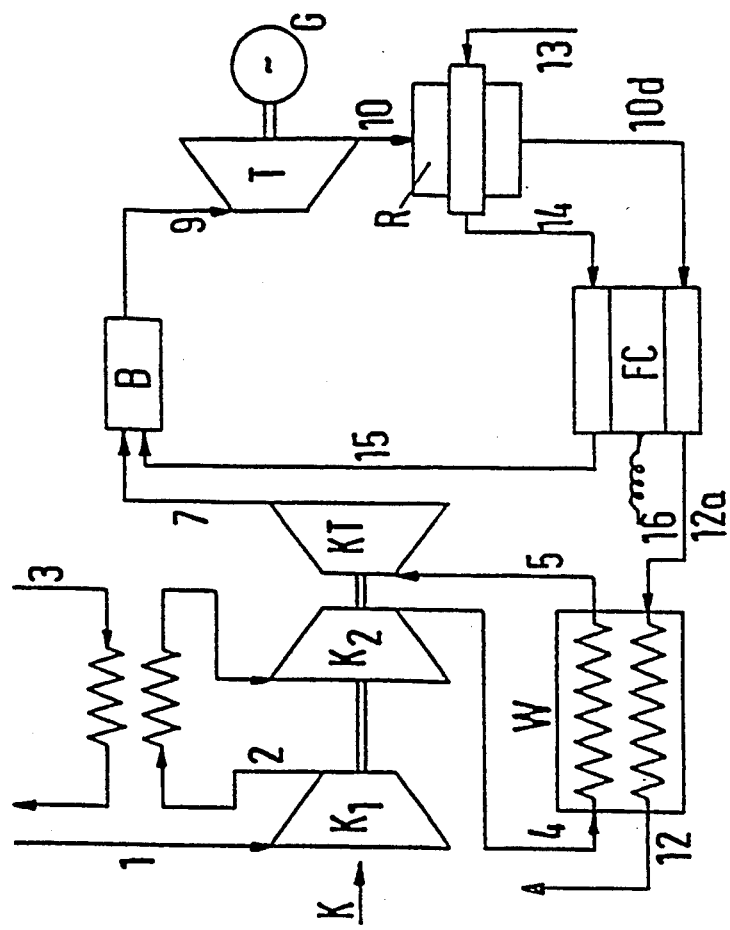
FIG. 2 is a schematic drawing of the second embodiment of the present invention.

In FIG. 2, two gas turbines are provided, the first gas turbine KT being responsible exclusively for driving the compressor system K, while the second gas turbine T generates the mechanical energy which can be output. With such a distribution of labor between the gas turbines KT and T it is also possible in principle, as distinct from the drawing, to arrange these gas turbines on a common shaft. A substantial difference compared to FIG. 1 consists in that the combustion chamber B is only arranged after the compressor drive turbine KT.

The compressor drive turbine KT is therefore driven solely by the partial expansion of the adequately heated compressed combustion air in the heat exchanger W. A further difference consists in that the fuel cell FC is not arranged at the end of the process on the exhaust gas side. Rather, the combustion gas is guided, via the pipeline 10d, into the cathode space of the fuel cell system FC immediately after leaving the heating space of the steam reformer R. Only then does it arrive in the heat exchanger W through a pipeline 12a for indirect heating of the compressed combustion air. This arrangement is preferred for fuel cell types with a higher operating temperature (e.g. in melt-carbonate (MCFC) or solid-oxide fuel cells (SOFC)).

Figure 3:
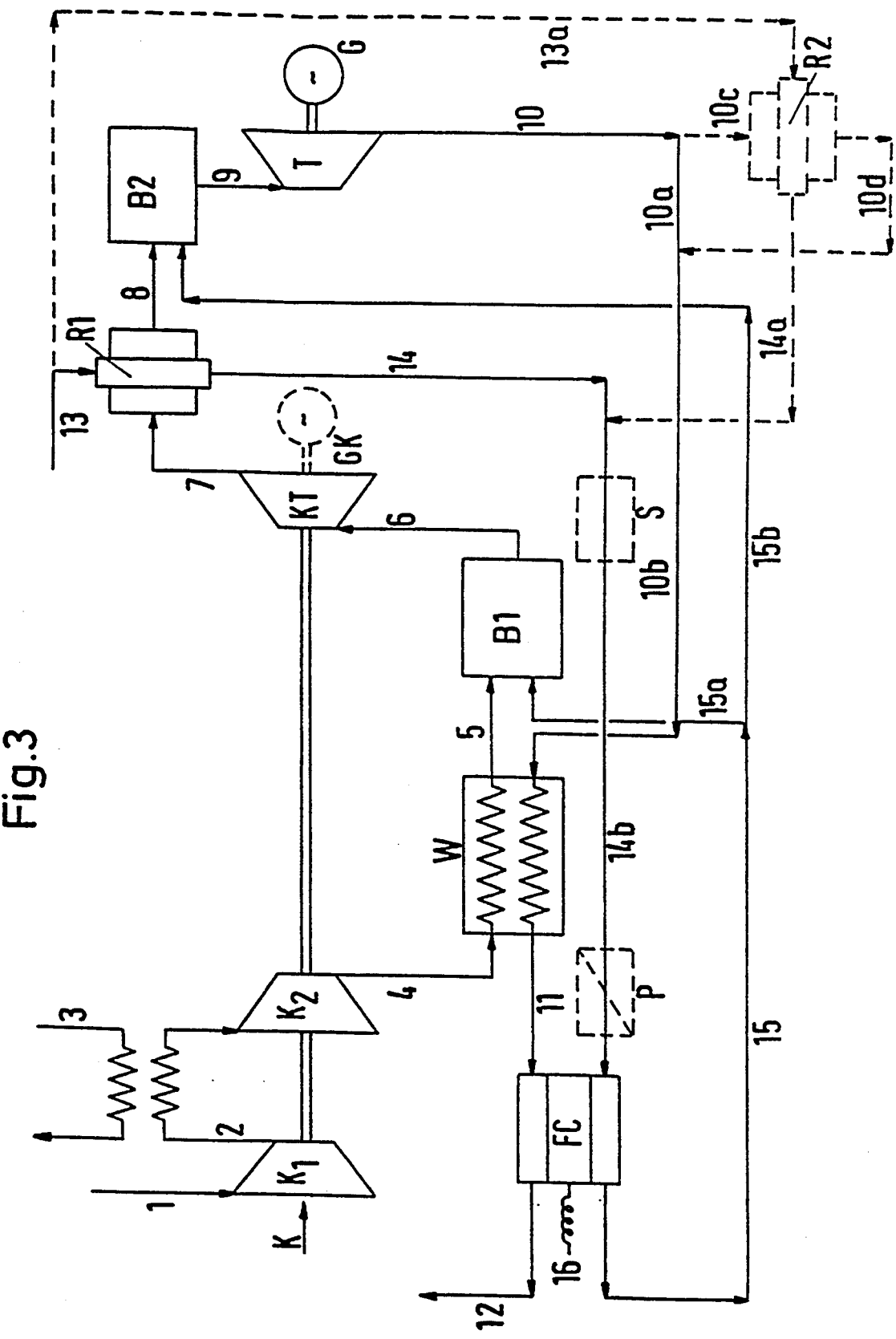
FIG. 3 is a schematic drawing of the third embodiment of the present invention.

The variant of the process shown in FIG. 3 has two separate gas turbines KT and T, as is the case in FIG. 2. However, the combustion of the combustible components of the anode exhaust gas of the fuel cell system FC takes place in two combustion chambers B1 and B2 which are arranged respectively immediately prior to one of the two gas turbines KT and T.

This gas turbine KT can also be used for generating mechanical or electrical energy, since the compressed gas which can be expanded in the compressor drive turbine KT and which covers the total requirement of oxygen for the process can be raised by means of the combustion chamber B1 to a substantially higher energy level than would be practicable if the temperature increase were effected solely by means of the indirect heat exchange in the heat exchanger W. Therefore, an additional electric generator GK (shown in dashed lines) is coupled to the compressor drive turbine KT in the drawing.

Another possible modification of the process according to the invention consists in the use not only of a plurality of gas turbines and combustion chambers, but also a plurality of steam reformers. The latter can be connected in parallel, for example. But it is particularly advantageous to connect them in series, as is shown in dashed lines in FIG. 3. The first steam reformer R1 is connected immediately subsequent to the compressor drive turbine KT. The cooled combustion gas which flows out of the heating space of the steam reformer R1 and still has a considerable oxygen content is directed into the second combustion chamber B2 via the pipeline 8. A partial flow 15b of the anode exhaust gas drawn off through pipeline 15 is burned in this combustion chamber B2, while the other partial flow 15a is burned in the first combustion chamber B1. The combustion process in the second combustion chamber B1 creates a hot flow of combustion gas constituting a correspondingly greater quantitative flow compared with the combustion gas flowing out of the first combustion chamber B1. It is guided through the pipeline 9 to the gas turbine T, expanded above the given operating pressure of the fuel cell FC, and guided further through the pipeline 10. But the combustion gas is not then guided through the pipeline segment 10a of the line 10, but rather arrives in the heating space of the second steam reformer R2 via the pipeline 10c, shown in dashed lines, and is guided back into the pipeline segment 10b of line 10 via the pipeline 10d after yielding heat. This line 10 leads directly to the heat exchanger W as shown in FIG. 1. The steam reformer R2 is supplied with gaseous hydrocarbons and steam via the pipeline 13a, shown in dashed lines. The hydrogen-rich gas formed in the steam reformer R2 is guided to line 14 through pipeline 14a and reaches the anode space of the fuel cell system FC together with the hydrogen-rich gas formed in the steam reformer R1 by way of pipeline segment 14b. Of course, the fuel cell system FC can be made up of a plurality of individual fuel cells.

FIG. 3 shows two further developments of the process which can be advantageous in many cases. For example, the hydrogen-rich gas can be subjected to a $CO/H_2$ shift reaction in one or more reactors S before being supplied to the fuel cell FC to increase the hydrogen content. This is an exothermic reduction, wherein the conversion of CO with water vapor to form $CO_2$ and $H_2$ causes an increase in the hydrogen component. Moreover, it is advisable in fuel cells which are sensitive to certain gas components (e.g. CO) to provide a corresponding gas purification P (e.g. by means of diaphragms or pressure shift adsorption PSA). Such a gas purification is also advantageous for increasing the fuel cell efficiency. As shown in FIG. 3, the separated gas, insofar as it contains combustible components, is preferably supplied directly to the combustion chambers B1 and B2.

Figure 4:
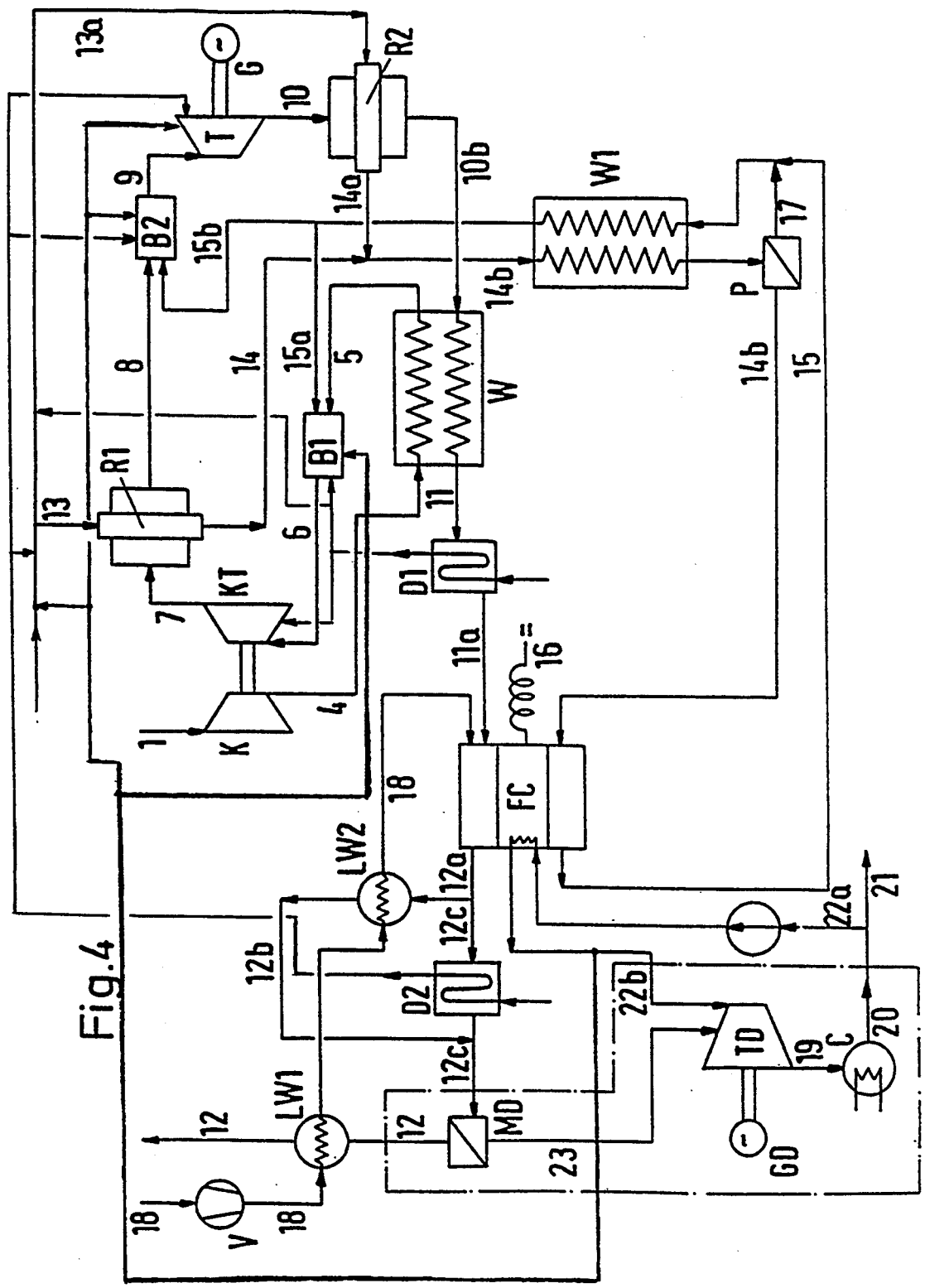
FIG. 4 is a schematic drawing of the fourth embodiment of the present invention.

The invention is shown schematically in FIG. 4 in an embodiment form which includes an additional steam turbine process for generating energy and accordingly enables a substantial increase in overall efficiency in the conversion of the energy bonded in the utilized primary fuel (net calorific value) into mechanical and electrical energy up to an order of magnitude of 70–80%. In contrast to FIG. 3, the compression of the combustion air is effected in the compressor system K without intermediate cooling, that is, in only one stage. However, in order to achieve the highest possible compression it is advantageous to take in air which is already cooled beforehand through the pipeline 1. Further, a heat exchanger W1 is inserted into the pipeline 14b in which the hydrogen-rich gas flows (lines 14 and 14a) generated in the steam reformers R1 and R2 are combined. The heat exchanger W1 causes an indirect exchange of the heat of the hydrogen-rich gas for preheating the combustible, hydrogen-containing gas which is guided through pipelines 15 (of the fuel cell FC) and 17 (of the gas purification P) and directed to the heating spaces of the steam reformers R1 and R2 through pipeline 15a and 15b.

A further difference with respect to FIG. 3 consists in that FIG. 4 shows two steam generators $D_1$ and $D_2$ in which live steam is produced by indirect heat exchange with the hot combustion gas and can be used to advantage for generating the hydrocarbon/steam mixture (reformer charging material), although this is not shown in the drawing. Other advantageous possible uses for the generated steam are for cooling the turbine blades and introducing steam into the combustion chambers B1 and B2 to increase the mass flow.

Whereas the steam generator $D_1$ is connected into the pipelines 11 and 11a and the combustion gas is cooled approximately to the operating temperature of the fuel cell FC, the steam generator $D_2$ is installed in pipeline 12c, through which only a portion of the cathode exhaust gas (line 12a) is guided. The other part of the cathode exhaust gas arrives in an indirectly heated air preheater $LW_2$ in a secondary flow through pipeline 12b as heating medium and is then guided into the pipeline 12c again. In this embodiment form of the invention, the oxygen content in the combustion gas is, by itself, generally no longer sufficient to ensure the supply of cathode gas to the fuel cell system FC. Therefore, an additional flow of fresh air is guided through the pipeline 18 into the cathode space of the fuel cell system FC. In addition to the air preheater $LW_2$, an air preheater $LW_1$ is provided for heating this extra air flow roughly to the operating temperature of the fuel cell system FC, the extra air flow being brought to operating pressure by means of a compressor V. The air preheater $LW_1$ is inserted into line 12 on the heating side, the extensively cooled combustion gas being guided off through this line 12.

These modifications of the invention could also be applied within the framework of the embodiment forms according to FIGS. 1–3. However, a substantial advance with respect to the highest possible efficiency of energy conversion is achieved particularly by the additional incorporation of a steam turbine process into the process according to the invention. The additional plant technology essential for this purpose is enclosed by dash-dot lines and displayed in FIG. 4.

Before entering the air preheater $LW_1$ after passing through the steam generator $D_2$ or air preheater $LW_2$, the combustion gas, which is generally expanded virtually to atmospheric pressure, is split into two different partial flows in a separating installation MD (e.g. diaphragm filter), namely into a genuine exhaust gas flow directed out through the line 12 and a steam flow directed out from the separating installation MD through the separate line 23. It is essential that the water proportion contained in the combustion gas be separated out in this separating unit MD in the form of steam, rather than in liquid form (e.g. by means of condensers). Because of its low pressure, this steam is fed via a corresponding low-pressure steam inlet to a steam turbine TD and is expanded therein. This is made possible in that the condenser C connected to the steam turbine TD via the line 19 is operated under vacuum. If the gaseous components of the combustion gas flow were not separated out in the separating unit MD, the required vacuum in the condenser could not be maintained in a technically and economically feasible manner.

In addition, the steam turbine TD is acted upon by steam at a higher pressure via the line 22b. This steam is generated in connection with the cooling of the fuel cell system FC which is explained, though not shown separately, in the other drawings. For this purpose, a portion of the condensate produced in the condenser C is used as cooling fluid and is fed via line 20 and line 22a to the cooling system of the fuel cell system FC. Surplus condensate can be drawn off through line 21 and used, for example, to generate steam in the steam generators $D_1$ and $D_2$ or as valuable demineralized water in other processes. Since the process according to the invention is based on a progressive oxidation of $H_2$ to form $H_2O$, a surplus of water and accordingly a valuable by-product is compulsorily produced.

The mechanical energy occurring as a result of the expansion of the low- and higher-pressure steam is converted to alternating current in the present case by the electric generator GD coupled to the steam turbine TD. Of course, the two generators GD and G can be physically combined in one unit or mechanically coupled.

The steam produced in the steam generators $D_1$ and $D_2$ is advisably used particularly for the above-mentioned cooling of the turbine blades and introduction into the combustion chambers B1 and B2 (also for regulating the temperature of the combustion gas). Of course, uses of the generated steam outside the process according to the invention are also conceivable. However, the proportion of chemically bonded energy of the primary fuel converted to mechanical or electrical energy is necessarily reduced in such a case.

Figure 5:
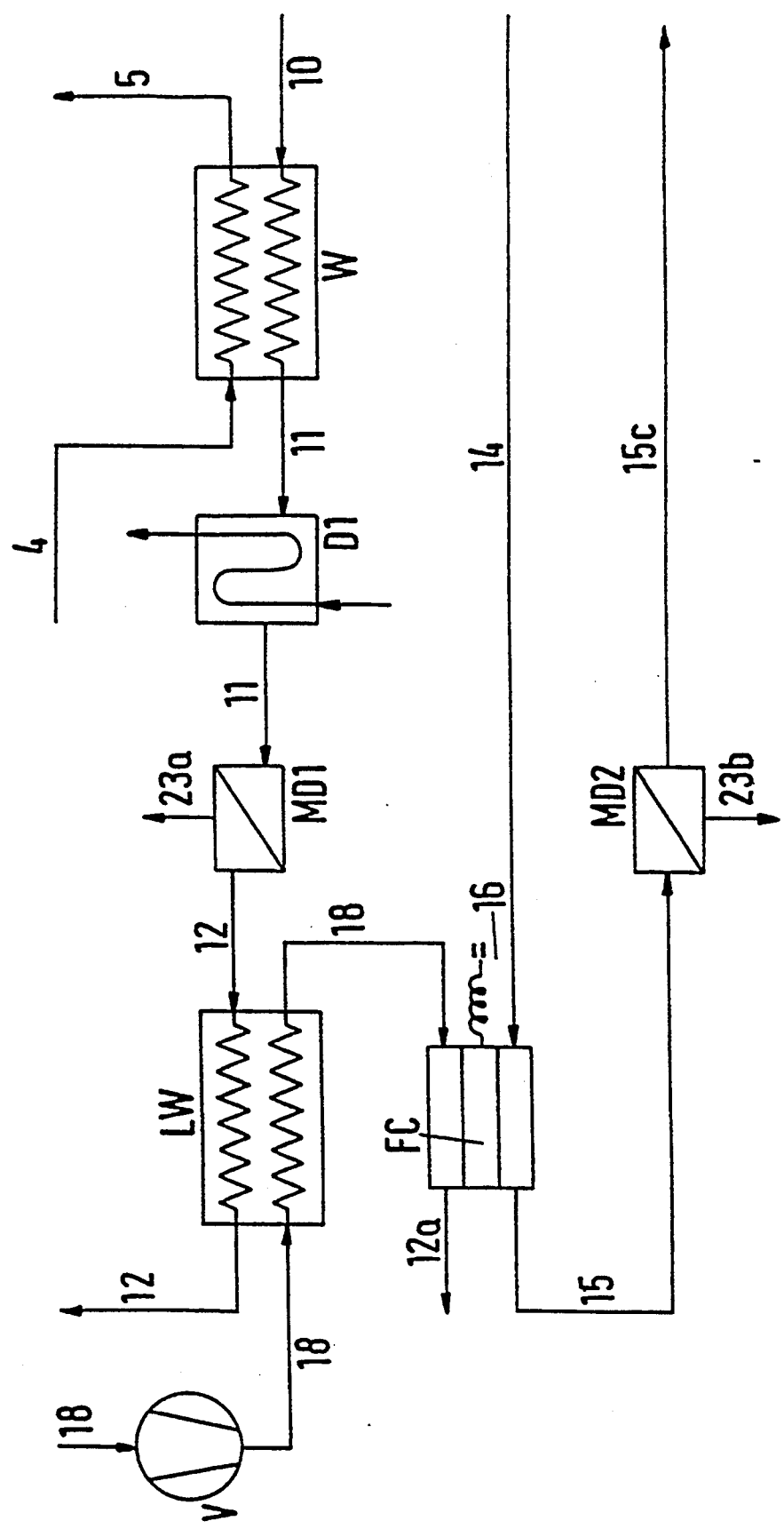
FIG. 5 is a schematic drawing of the fifth embodiment of the present invention.

In each of the embodiment forms shown in FIGS. 1 to 4 it is assumed that the cathode exhaust gas (e.g. PAFC type) contains the $H_2O$ proportion formed in the fuel cell system FC. However, this need not always be the case. FIG. 5 shows a variant in a corresponding section of the schematic diagram of the entire installation in which the fuel cell system operates on the basis of an alkaline electrolyte (AFC). In this case, a hydrogen-rich gas is again fed to the anode space via a line 14. However, the water vapor component formed in the fuel cell FC exits the latter in the anode exhaust gas through line 15. Therefore, in order to obtain steam, a separating unit $MD_2$ is connected to the line 15. The steam which is separated out can be expanded again, for example, in a steam turbine, not shown, through line 23b, while the gaseous part is fed to the combustion chambers (not shown) via line 15c to exploit its combustible components.

Since the combustion gas from the combustion chambers contains components which considerably impair the life of alkaline fuel cells, this combustion gas is advisably not used as cathode gas for the oxygen supply of the fuel cell FC. For this purpose, it is advisable to use fresh air which is compressed in the compressor V to operating pressure and is preheated by indirect means in the air preheater LW by means of the heat contained in the combustion gas. The compressor V and the air preheater LW are connected into the air feed line 18. A corresponding separating unit $MD_1$ (e.g. diaphragm filter) can be arranged between the pipelines 11 and 12 so that the water vapor component contained in the combustion gas can be exploited. The separated steam is drawn off via pipeline 23a and e.g. expanded in a steam turbine.

The efficiency of the process according to the invention is clearly shown in the following embodiment example which refers to an installation configured as shown in FIG. 4. A repeated description of details is therefore unnecessary. However, it should be noted that the utilized mixture of hydrocarbons and water vapor has been heated in the heat exchanger W to preheating temperature for the steam reformers R1 and R2. This advisable embodiment form of the invention is not shown in detail in FIG. 4. Precooled air has already been fed to the compressor K through line 1. The steam generated in the steam generator $D_1$ has been used in part for cooling the blades of the compressor drive turbine KT and supplied in part to the combustion chamber B1. In a corresponding manner, the steam generated in the steam generator $D_2$ is used in part for cooling the blades of the gas turbine T or guided into the second combustion chamber B2. Another portion of the generated steam served as charging material for the two steam reformers R1 and R2. The process flow can be gathered from the following tables listing the essential process parameters:

| Utilized fuel: | natural gas (predominantly $CH_4$) |
|---|---|
| compressor K: | |
| inlet temperature | 4° C. |
| outlet temperature | 160° C. |
| outlet pressure | 4 bar |
| heat exchanger W: | |
| temperature increase of combustion air | 405 K. |
| temperature drop of combustion gas combustion chamber B1: | 305 K. |
| temperature increase due to combustion compressor drive turbine KT: | 685 K. |
| inlet temperature | 1250° C. |
| pressure ratio of turbine | 1.45 |
| outlet temperature | 1150° C. |
| Reformer R1: | |
| inlet temperature of superheated hydrocarbon/steam mixture | 550° C. |
| outlet temperature of the combustion gas | 610° C. |
| outlet temperature of hydrogen-rich gas combustion chamber B2: | 720° C. |
| temperature increase due to combustion gas turbine T: | 595 K. |
| inlet temperature | 1205° C. |
| pressure ratio | 2.47 |
| outlet temperature | 980° C. |
| steam reformer R2: | |
| inlet temperature of the hydrocarbon/steam mixture | 550° C. |
| outlet temperature of combustion gas | 610° C. |
| outlet temperature of hydrogen-rich gas steam generator $D_1$: | 720° C. |
| water inlet temperature | 15° C. |
| steam outlet temperature | 290° C. |
| steam pressure | 4.5 bar |
| temperature drop of the combustion gas | 130 K. |
| fuel cell: | PAFC type |
| cathode gas inlet temperature | 175° C. |
| cathode gas outlet temperature | 200° C. |
| anode gas inlet temperature | 175° C. |
| anode gas outlet temperature | 200° C. |
| cooling of the fuel cell by generation of high-pressure steam | |
| air heater $LW_2$: | |
| inlet temperature of the air | 15° C. |
| temperature increase of the air | 160 K. |
| temperature drop of the combustion gas partial flow | 150 K. |
| steam generator $D_2$: | |
| water inlet temperature | 15° C. |
| steam outlet temperature | 185° C. |
| steam pressure | 3 bar |
| temperature drop of the combustion gas partial flow | 100 K. |
| steam turbine TD: | |
| high-pressure steam inlet temperature | 165° C. |
| high-pressure steam inlet pressure | 6.5 bar |
| low-pressure steam inlet temperature | 100° C. |
| low-pressure steam inlet pressure | 1 bar |
| condenser pressure | 0.15 bar |
| electric lines: | |
| generator G of the gas turbine T | 1860 $KW_{el}$ |
| generator GD of the steam turbine TD | 1935 $KW_{el}$ |
| fuel cell FC | 16375 $KW_{el}$ |
| electrical efficiency based on net calorific value | 75.2% |

In comparison to the known processes for generating electrical or mechanical energy from fossil fuels, the process according to the invention not only has a considerably higher efficiency and accordingly releases considerably less $CO_2$ in relation to the electrical output, but also supplies an exhaust gas with a minimum content of nitric oxides. In addition, valuable process water which can be used for other purposes occurs as a by-product.

It is particularly advantageous that the "combustion chamber/turbine/reformer" unit combination which is duplicated (serially connected) in FIGS. 3 and 4 can be identically constructed in practice and integrated in a housing so that a comparatively simple and inexpensive construction of an installation according to the invention is ultimately made possible in spite of a relatively complicated overall connection.

What is claimed is:

1. Process for the combined generation of electrical and mechanical energy from the oxidation of fuel, said process comprising the steps of:
   generating a hydrogen-containing gas by endothermic reaction of hydrocarbon compounds in at least one stage with indirect heating of the endothermic reaction;
   guiding at least a portion of the hydrogen-containing gas generated in the endothermic reaction as anode gas through a fuel cell system for generating electrical energy;
   introducing the anode gas exhausted from the fuel cell system containing a residual content of hydrogen in at least one combustion stage for generating a hot combustion gas at increased pressure;
   compressing an oxygen-containing gas;
   introducing the compressed oxygen-containing gas into the at least one combustion stage for generating the hot combustion gas;
   generating mechanical energy by means of at least partial expansion of the hot combustion gas in at least one gas turbine;
   indirectly heating the endothermic reaction using at least a partial flow of the at least partial expansion of the hot combustion gas, wherein the combustion gas is partially cooled in the endothermic reaction:
   supplying the mechanical energy generated in said generating step for the compression of the oxygen-containing gas;
   heating the compressed oxygen-containing gas by indirect heat exchange with the partially cooled combustion gas in the endothermic reaction;
   generating the combustion gas having increased pressure with surplus oxygen; and
   feeding the partially expanded combustion gas from the at least one gas turbine to the fuel cell system as cathode gas after conveying heat to compressed oxygen-containing gas.

2. A process according to claim 1, wherein the fuel cell system comprises a low-temperature fuel cell selected from the group consisting of electrolytes based on phosphoric acid (PAFC), alkali (AFC) and solid polymers (SP(E)FC).

3. A process according to claim 2, wherein the generation of the combustion gas having an increased pressure is effected in at least two stages.

4. A process according to claim 3, wherein the combustion gas is at least partially expanded in a gas turbine after every combustion stage.

5. A process according to claim 4, wherein the combustion gas, which is at least partially expanded, is used subsequent to the gas turbine for the indirect heating of a stage of the endothermic reaction.

6. A process according to claim 5, further comprising the steps of:
   collecting partial quantities of hydrogen-containing gas generated in the at least one stage of the endothermic reaction; and
   supplying the collected partial quantities of hydrogen-containing gas to the anode space of the fuel cell system.

7. A process according to claim 1, further comprising the step of subjecting the generated hydrogen-containing gas to a purification so that gas components are separated out prior to being fed to the fuel cell system, and wherein the separated gas components containing combustible components are used in generating the combustion gas.

8. A process according to claim 1, wherein natural gas is used in the generation of the combustion gas.

9. A process according to claim 1, further comprising the steps of:
   extracting residual heat of the cathode exhaust gas of the fuel cell system; and
   supplying the residual heat to processes independent of the generation of one of mechanical and electrical energy.

10. A process according to claim 1, further comprising the step of separating water formed in the fuel cell system and the generation of the combustion gas at least in part from the fuel cell exhaust gas.

11. A process according to claim 10, wherein the water is separated out in the form of water vapor.

12. A process to claim 11, wherein the fuel cell system is cooled and accompanied by the generation of water vapor.

13. A process according to claim 12, further comprising the step of providing the water vapor to a steam turbine process for work output.

14. A process according to claim 13, further comprising the step of condensing the water vapor after expansion in the steam turbine process to below-atmospheric pressure for obtaining process water.

15. A process according to 14, further comprising the step of generating water vapor by indirect heat exchange using a portion of the heat contained in the combustion gas.

16. A process according to claim 15, further comprising the step of cooling the turbine blades with at least a portion of the water vapor.

17. A process according to claim 16, further comprising the step of guiding at least one portion of the water vapor into a combustion space in which the combustion gas is generated.

18. A process according to claim 17, further comprising the step of providing a portion of the water vapor as charging material for the endothermic reaction of the hydrocarbons running as steam reformation.

19. A process according to claim 1, further comprising a step of converting the generated mechanical energy into electrical alternating current by means of a generator system.

20. An apparatus for the combined generation of electrical and mechanical energy from the oxidation of fuel comprising
   a compressor system for compressing oxygen-containing gas;
   at least one combustion chamber for at least partial combustion of a hydrogen-containing gas;
   gas turbine means comprising at least one gas turbine for supplying mechanical energy to an external apparatus and for supplying drive energy for said compressor system;
   first pipeline means for feeding the compressed oxygen-containing compressed gas to said gas turbine means after passing through said at least one of said combustion chambers in the form of hot combustion gas;
   at least one reactor for an endothermic reaction for generating a hydrogen-rich gas which is heated indirectly by the hot exhaust gas of said gas turbine means;
   a fuel cell system comprising an anode space and a cathode space;

second pipeline means for feeding the hydrogen-rich gas to said anode space of said fuel cell system;

third pipeline means for feeding the gas containing a residual amount of hydrogen to said at least one combustion chamber from the output of said anode space;

a heat exchanger for heating the compressed oxygen-containing gas;

fourth pipeline means for feeding the turbine exhaust gas to said heat exchanger for heating the compressed oxygen-containing gas after yielding heat in said at least one reactor; and fifth pipeline means for feeding the turbine exhaust gas to said cathode space of said fuel system as oxygen-containing gas.

21. An apparatus according to claim 21, said fifth pipeline means guides the turbine exhaust gas from said at least one reactor to said cathode space of said fuel cell system.

22. An apparatus according to claim 20, further comprising a sixth pipeline means for guiding the turbine exhaust gas from said heat exchanger to said cathode space of said fuel cell system.

23. An apparatus according to claim 20, wherein said gas turbine means comprises a first gas turbine for driving said compressor system and at least one second gas turbine independent from said first gas turbine for generating the output mechanical energy.

24. An apparatus according to claim 20, wherein said at least one combustion chamber is arranged between said compressor system and gas turbine means.

25. An apparatus according to claim 20, wherein said gas turbine means is arranged in series with respect to the passage of the combustion gas.

26. An apparatus according to claim 20, further comprising at least one gas purification installation arranged in said second pipeline feeding of the hydrogen-rich gas to said anode space of said fuel cell system.

27. An apparatus according to claim 20, further comprising an electric generator coupled to said gas turbine means for generating electrical energy.

28. An apparatus according to claim 27, further comprising an invertor coupled to said fuel cell system for generating alternating electrical current.

29. An apparatus according to claim 27, wherein said fuel cell system is electrically coupled with said electric generator.

30. An apparatus according to claim 20, further comprising a separating device and eighth pipeline means for guiding the water formed from exhaust gas from one of said cathode and exhaust of said fuel cell system to said separating device, wherein said separating device separates the water formed from the exhaust gas as steam.

31. An apparatus according to claim 20 further comprising a fresh air feed and at least one preheater, wherein said cathode space of said fuel cell system is connected with said fresh air feed, and wherein said fresh air feed is connected to said at least one air preheater and heatable with the combustion gas.

32. An apparatus according to claim 20, wherein said at least one reactor for the endothermic reaction comprises at least one steam reformer.

33. An apparatus according to claim 20, further comprising at least one heat exchanger for transmitting heat indirectly from the hydrogen-rich gas generated in said at least one reactor to the hydrogen-containing gas to be fed to said at least one combustion chamber.

34. An apparatus according to claim 20, wherein said fuel cell system comprises a low-temperature fuel system having electrolytes selected from the group consisting of on phosphoric acid (PAFC), alkali (AFC), and solid polymers (SP(E)FC).

* * * * *